Figure 1:
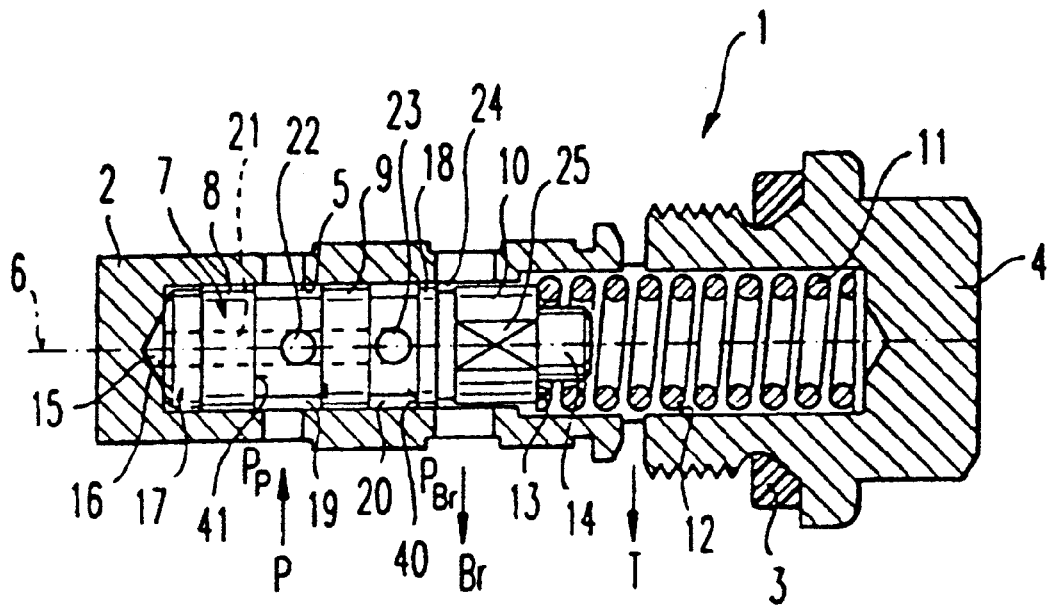

United States Patent [19]
Hörmann

[11] Patent Number: 5,996,616
[45] Date of Patent: Dec. 7, 1999

[54] REDUCTION AND CONTROL VALVE

[75] Inventor: Werner Hörmann, Illtertissen, Germany

[73] Assignee: Brueninghaus Hydromatik GmbH, Elchingen, Germany

[21] Appl. No.: 09/180,866

[22] PCT Filed: Sep. 24, 1997

[86] PCT No.: PCT/EP97/05254

§ 371 Date: Nov. 23, 1998

§ 102(e) Date: Nov. 23, 1998

[87] PCT Pub. No.: WO98/16768

PCT Pub. Date: Apr. 23, 1998

[30] Foreign Application Priority Data

Oct. 15, 1996 [DE] Germany ............... 196 42 567

[51] Int. Cl.$^6$ .............................................. F16K 17/04
[52] U.S. Cl. ........................................................ 137/494
[58] Field of Search .................................... 137/494, 102

[56] References Cited

U.S. PATENT DOCUMENTS

| | | | |
|---|---|---|---|
| 1,959,909 | 5/1934 | Farmer | 137/494 |
| 2,630,825 | 3/1953 | Stephens | 137/494 |
| 4,237,933 | 12/1980 | Bauer . | |

FOREIGN PATENT DOCUMENTS

| | | |
|---|---|---|
| 34 31 103 A1 | 3/1986 | Germany . |
| 42 15 724 A1 | 11/1992 | Germany . |
| 44 20 164 A1 | 12/1995 | Germany . |
| 195 10 586 A1 | 9/1996 | Germany . |

*Primary Examiner*—Stephen M. Hepperle
*Attorney, Agent, or Firm*—Scully, Scott, Murphy & Presser

[57] ABSTRACT

The present invention pertains to a dual-function hydraulic valve (1), i.e., a control valve and a pressure reduction or limitation valve at the same time. The inventive combined hydraulic valve (1) encompasses a valve casing (2) with a first central pressure connection (P), a second central pressure connection (Br) and a movable flow check piston (7) in the valve casing (2). The flow check piston (7) presents a pressure surface (16) enabling it (P), when the first central connection is put under supply pressure ($P_p$), to move from its basic position against an opposing force proportional to said supply pressure ($P_p$) It also presents a first control ridge (40) and a second control ridge (41). The first control ridge (40) is used to link the first central pressure connection (P) to the second central pressure connection (Br), starting from a first set minimum displacement of the flow check piston (7) which corresponds to a lower threshold value ($P_1$) of the supply pressure ($P_p$). The second control ridge (41) is used to break the linkage of the first (P) central pressure connection with both the second central pressure connection (Br) and the pressure surface (16), starting from a set maximum displacement (7) which corresponds to a higher threshold value ($P_2$) of the supply pressure ($P_p$).

13 Claims, 4 Drawing Sheets

REDUCTION AND CONTROL VALVE

The invention relates to a hydraulic pressure-reducing valve with an upstream control valve.

Pressure-reducing valves and control valves are already known as individual components in a wide variety of forms.

Figure 4:
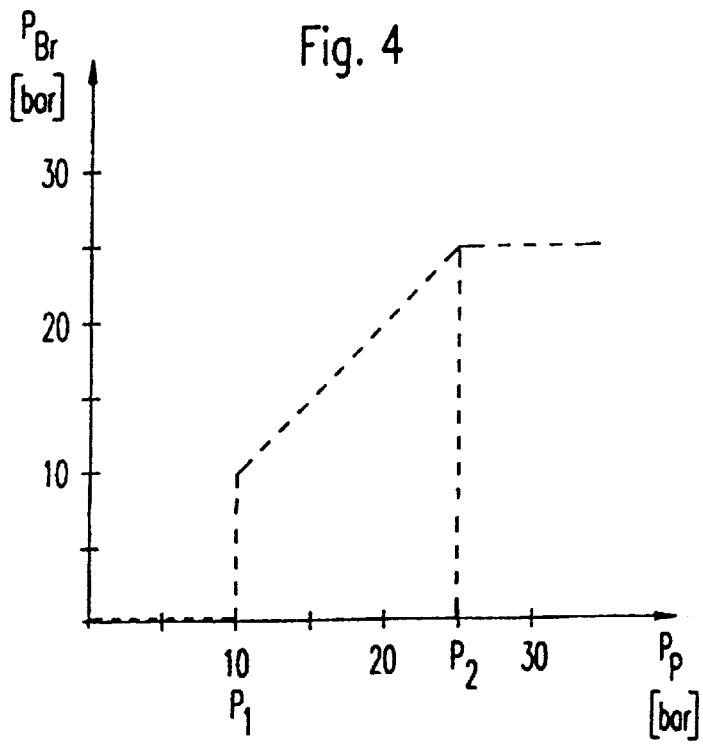

For hydraulic activation of certain devices, e.g. a holding brake, it is necessary to connect a control valve upstream of the pressure-reducing valve in order to achieve a defined activation characteristic, for example as shown in FIG. 4. In addition to a low-pressure range, in which the valve is not supposed to respond, a proportional control range and a pressure-limiting range, in which the control pressure is limited to a maximum pressure, are to be created. Hitherto it was customary to produce this control characteristic by having several single valves, in particular a control valve and a pressure-reducing valve, connected together as single components. However, this solution consisting of several single valves is costly and requires a relatively large installation space owing to the minimum of two single valves to be provided. A relatively complex construction results, especially if a discharge throttle is to be provided in addition.

The object of the invention is therefore to combine the functions of a control valve and a pressure-reducing valve in a single combined hydraulic valve.

This object is achieved by the features of claim 1.

The invention is based on the formulated solution of displacing an actuating piston proportionally to a supply pressure and of assigning to the actuating piston different control functions in the range between the starting position and a minimum displacement, the range between the minimum displacement and maximum displacement and on reaching the maximum displacement respectively.

Claims 2 to 14 contain advantageous developments of the invention.

According to claim 2, a third pressure medium connection can be provided on the hydraulic valve according to the invention, which connection is connected to the second pressure medium connection via a throttle. A discharge throttle can thus be integrated additionally into the hydraulic valve according to the invention, so that the number of functions of the hydraulic valve according to the invention and the degree of integration can be increased further. According to claim 3, the throttle can be formed simply on the actuating piston as a flattening, notch or hole, which is particularly easy to realize in manufacturing technology.

The restoring force proportional to the supply pressure can be exerted for example according to claim 5 by a restoring spring formed on the end opposing the pressure surface, which spring can likewise be integrated easily into the valve casing. The restoring force exerted by the restoring spring can be adjustable advantageously according to claim 6 by changing the position of a spring plate, so that the characteristic of the hydraulic valve according to the invention is adjustable from outside the valve body.

A first annular groove can be formed according to claim 7 on the control piston, one lateral edge of which groove according to claim 8 advantageously forms the second control edge. The pressure-reducing or pressure-limiting function is assigned here to the control edge formed on the first annular groove. A second annular groove can be formed accordingly on the actuating piston according to claim 10, one lateral edge of which groove according to claim 11 advantageously forms the first control edge. Assigned to the second annular groove here is the control function on reaching the minimum displacement of the actuating piston corresponding to the first threshold value of the supply pressure and the pressure-regulating function proportional to the supply pressure in the range between the minimum and maximum displacement of the actuating piston. The first annular groove, second annular groove and a pressure chamber of the valve body adjacent to the pressure surface of the actuating piston can be connected to one another via one or more holes provided in the actuating piston according to claim 12.

Furthermore, the actuating piston can have a third annular groove according to claim 13 for leading the pressure medium into the throttle.

A device can also be provided according to claim 14 for stopping the actuating piston in a releasable manner.

Figure 2:
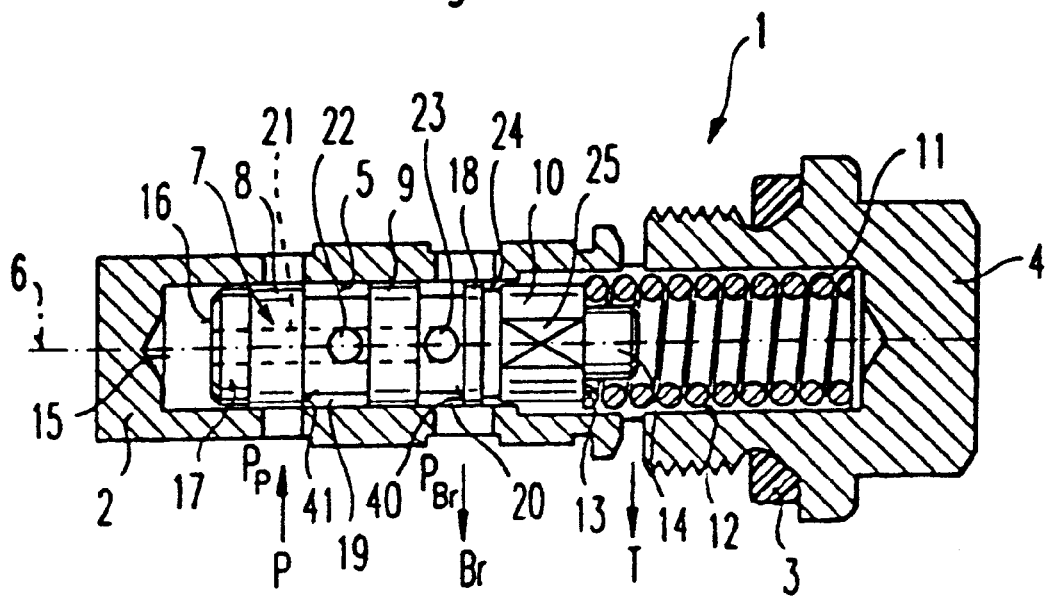
Figure 3:
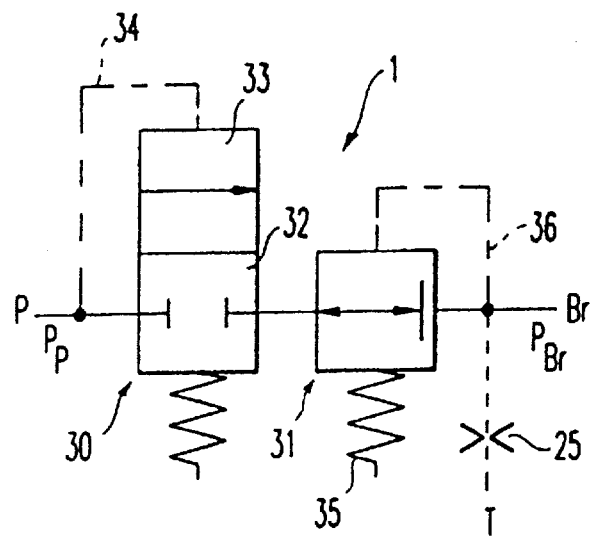
Figure 5:
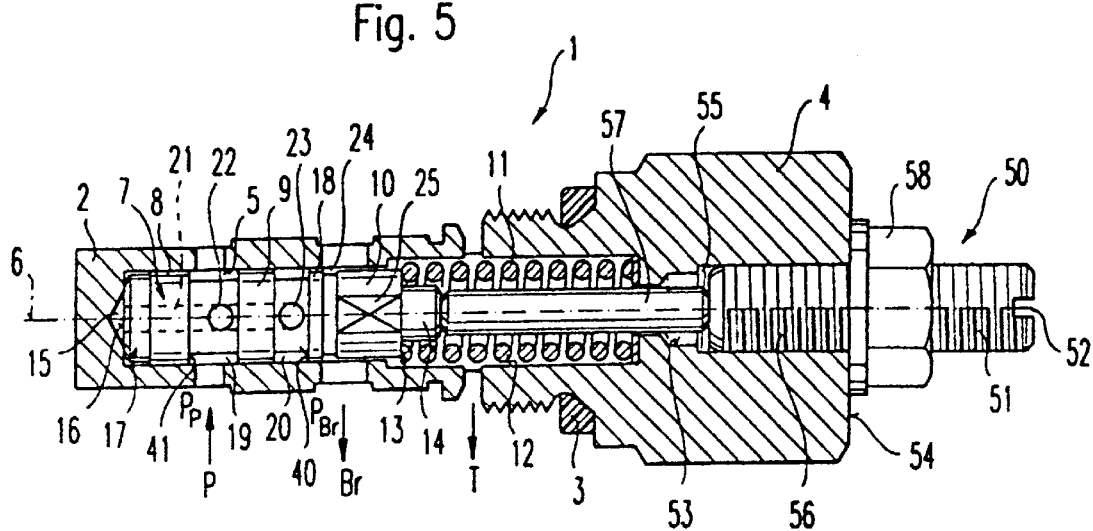
Figure 6:
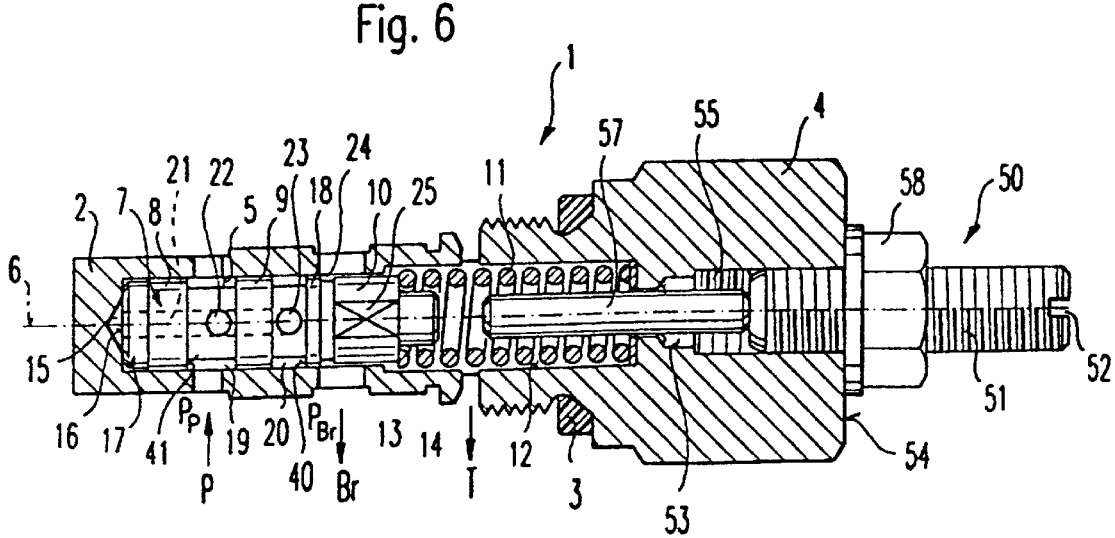
Figure 7:
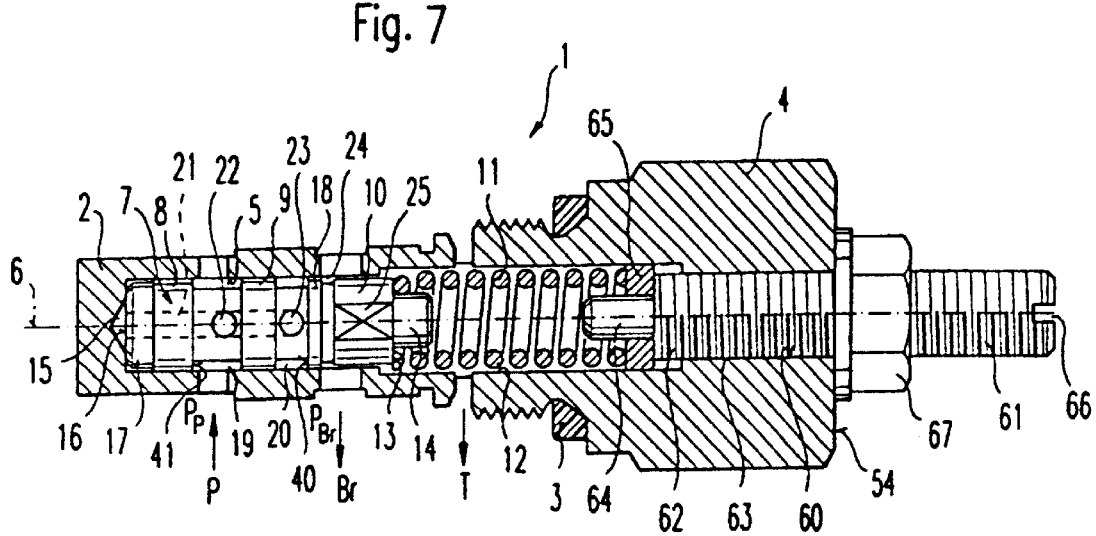
Figure 8:
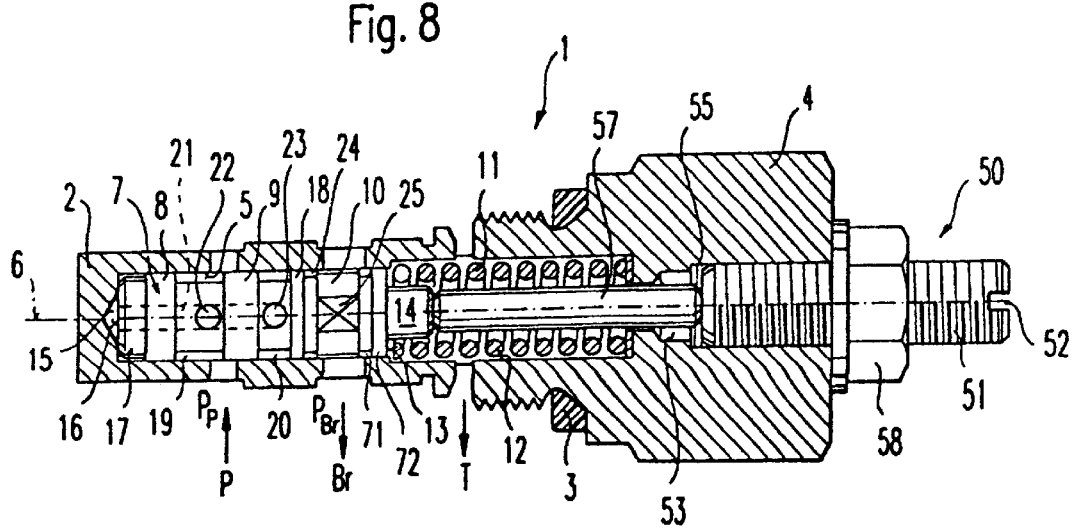

The invention is explained in greater detail below with reference to preferred practical examples and to the drawing. In the drawing:

FIG. 1 shows a longitudinal section through a first practical example of the hydraulic valve according to the invention in the starting position of the actuating piston, FIG. 2 shows a longitudinal section through the practical example according to FIG. 1 with a position of the actuating piston displaced from the starting position, FIG. 3 shows a hydraulic equivalent circuit diagram of the hydraulic valve according to the invention, FIG. 4 shows a characteristic curve of the hydraulic valve according to the invention, FIG. 5 shows a longitudinal section through a second practical example of the hydraulic valve according to the invention with the actuating piston stopped, FIG. 6 shows a longitudinal section through the practical example according to FIG. 5 with the actuating piston released, FIG. 7 shows a longitudinal section through a third practical example of the hydraulic valve according to the invention with an adjustable restoring spring and FIG. 8 shows a longitudinal section through a fourth practical example of the invention.

FIG. 1 shows a longitudinal section through the valve body 2 of the combined hydraulic valve 1 according to the invention. The valve body 2 is insertable into a valve seat (not shown) and sealable in relation to this by means of a sealing ring 3. In this case the right end 4 of the valve body 2 shown in the drawing is accessible from outside.

Formed in the valve body 2 are a first pressure medium connection P, which comes e.g. from a pressure line, a second pressure medium connection Br, which leads to the hydraulic unit to be activated, e.g. a holding brake, and a third pressure medium connection T, which is connected to the pressure medium tank. The flow direction of the pressure medium flowing between the pressure medium connections P, Br, T is identified by corresponding arrows. The supply pressure existing at the first pressure medium connection P is designated $P_p$ below and the output pressure or control pressure existing at the second pressure medium connection Br is designated $p_{Br}$ below.

The valve body 2 has an axial longitudinal hole 5, which extends parallel and concentric to the longitudinal axis 6 of the valve body 2. Disposed axially movably in the longitudinal hole 5 of the valve body 2 is an actuating piston 7, which is guided by guide sections 8, 9, 10 and 18 in the axial longitudinal hole 5 of the valve body 2. When not acted upon by the supply pressure $P_p$, the actuating piston 7 is pressed by the restoring spring 11 into the starting position shown in FIG. 1. To take up the restoring spring 11, the valve body 2 has a spring chamber 12 connected axially to the axial longitudinal hole 5. The restoring spring 11 formed as a pressure spring is supported here at one end of the spring chamber 12 on the valve body 2 and acts on a first end 13 of the actuating piston 7. At the first end 13 of the actuating piston 7 in the practical example a cylindrical stump 14 with a reduced diameter is formed on the actuating piston 7, so as to arrest the restoring spring 11.

To displace the actuating piston 7 against the restoring force exerted by the restoring spring 11, a pressure chamber 15 is formed in the valve body 2, bordering on which is a face serving as a pressure surface 16 on the end 17 of the actuating piston 7 opposing the restoring spring 11. Formed on the actuating piston 7 are a first annular groove 19 and a second annular groove 20, which are separated from one another by the guide section 9. To connect the first annular groove 19 with the second annular groove 20 on the one hand and to connect the first annular groove 19 to the pressure chamber 15 on the other, the actuating piston 7 has an axial hole 21, which is formed as a pocket hole exiting into the pressure chamber 15. The axial hole 21 is connected via radial cross holes 22 and 23 to the first annular groove 19 and the second annular groove 20.

A third annular groove 24 is also formed in the actuating piston 7, which groove is located within the overall displacement range of the actuating piston 7 in the area of the second pressure medium connection Br. The third annular groove 24 serves according to a development according to the invention to connect a throttle 25 formed between the third annular groove 24 and the spring space 12 to the second pressure medium connection Br. Since the spring space 12 is connected via the third pressure medium connection T to the pressure medium tank, a throttled connection is yielded as a whole between the second pressure medium connection Br and the pressure medium tank, which is not shown. This connection is used to supply the pressure medium flowing back from the hydraulic unit connected at the second pressure medium connection Br to the pressure medium tank in a throttled manner. This development, which is not necessary in the scope of the basic concept of the present invention, increases the number of functions made available by the combined hydraulic valve 1 according to the invention, so that the degree of integration of the valve is further increased. The throttle 25 can be formed in a particularly simple way as a flattening on the outer circumference of the otherwise cylindrically formed guide section 10, which is especially easily realizable in manufacturing technology.

The first annular groove 19 is located in the area of the first pressure medium connection P in the starting position shown in FIG. 1, while the second annular groove 20 is located in the area between the first pressure medium connection P and the second pressure medium connection Br in this starting position.

For a better understanding of the mode of operation of the combined hydraulic valve 1 according to the invention, a characteristic curve of the hydraulic valve 1 according to the invention is described below with reference to FIG. 4. In FIG. 4, the output pressure $p_{Br}$ at the second pressure medium connection Br is shown as a function of the supply pressure $P_p$ existing at the first pressure medium connection P in a broken line. The pressure ranges indicated in FIG. 4 are only to be regarded as examples. In the scope of the invention a different numerical rating of the combined hydraulic valve 1 according to the invention is also easily possible.

While the supply pressure $P_p$ remains below a lower threshold value $p_1$ (10 bar in the practical example shown), the output pressure $p_{Br}$ at the second pressure medium connection Br is equal to zero. The control valve integrated into the combined hydraulic valve 1 according to the invention is closed in this range. As soon as the supply pressure $P_p$ existing at the first pressure medium connection P exceeds the lower threshold value $p_1$, the control valve opens. In the range above the lower threshold value $p_1$ but below an upper threshold value $p_2$, the output pressure $p_{Br}$ is proportional to the supply pressure $P_p$. If the supply pressure $P_p$ existing at the first pressure medium connection P exceeds the upper threshold value $p_2$ (25 bar in the practical example), then the combined hydraulic valve 1 according to the invention operates as a pressure-reducing or pressure-limiting valve. In the range above the upper threshold value $p_2$, the output pressure $p_{Br}$ is therefore largely constant regardless of the supply pressure $P_p$ (25 bar in the practical example shown). The hydraulic valve 1 according to the invention thus comprises both a control function and a pressure-limiting function.

The hydraulic equivalent circuit diagram corresponding to the hydraulic valve 1 according to the invention is shown in FIG. 3. A control valve 30 can be switched back and forth between a closed position 32 with interrupted flow and an open position 33 with open flow. If the supply pressure $P_p$ at the first pressure medium connection P is less than the lower threshold value $p_1$, the control valve 30 is in its closed position 32. As soon as a pressure $P_p$ exceeding the lower threshold value $p_1$ acts on a control line 34 connected to the first pressure medium connection P, the control valve 30 switches to its open position 33 and releases the flow. The pressure-reducing or pressure-limiting valve 31 is open as long as the output pressure $p_{Br}$ at the second pressure medium connection Br does not exceed the upper threshold value $p_2$. As soon as the supply pressure $P_p$ exceeds the second threshold value $p_2$, the pressure-reducing or pressure-control valve 31 adjusts the output pressure $p_{Br}$ to a constant output level which can be specified via the restoring spring 35. For this pressure-limiting function the control line 36 of the pressure-reducing or pressure-limiting valve 31 is connected to the second pressure medium connection Br.

According to a development according to the invention, a discharge throttle 25 can also be integrated into the combined hydraulic valve 1 according to the invention, which throttle connects the second pressure medium connection Br to a third pressure medium connection T, which is connected to the pressure medium tank. The discharge throttle 25 guarantees the return of the pressure medium from the hydraulically actuatable unit connected at the pressure medium connection Br to the pressure medium tank during the reset process. The actuating time of the unit is controlled by designing the discharge throttle 25 suitably.

Following the explanation of the basic mode of operation of the combined hydraulic valve 1 according to the invention, the mode of operation of a first practical example is now to be described below in greater detail with reference to FIGS. 1 and 2.

FIG. 1 shows the hydraulic valve 1 according to the invention in the starting position of the actuating piston 7. In this starting position the actuating piston 7 is located at its left stop in FIG. 1 owing to being acted upon by the restoring spring 11. The pressure medium chamber 15 is connected to the first pressure medium connection P via the axial longitudinal hole 21 and the radial cross hole 22 and is thus acted upon by the supply pressure $P_p$. The supply pressure $P_p$ thus acts on the pressure surface 16 of the actuating piston 7 and displaces this proportional to the supply pressure $P_p$ against the restoring spring 11. In this regard a first control edge 40 formed at the second annular groove 20 is displaced in FIG. 1 and 2 to the right in the direction of the restoring spring 11. As already mentioned, the second annular groove 20 is connected via the axial longitudinal hole 21 and the radial cross holes 22 and 23 to the first annular groove 19 and thus to the first pressure medium connection P.

Provided that the displacement of the actuating piston 7 is so slight that the first control edge 40 does not reach the second pressure medium connection Br, the connection between the second pressure medium connection Br and the first pressure medium connection P remains closed. However, as soon as the supply pressure $P_p$ exceeds the lower threshold value $p_1$, the displacement of the actuating piston 7 is so great that the first control edge 40 enters the area of the second pressure medium connection Br. Once the supply pressure $P_p$ has exceeded the lower threshold value $p_1$, the first pressure medium connection P is therefore connected to the second pressure medium connection Br via the first control edge 40 or the second annular groove 20. The output pressure $p_{Br}$ at the second pressure medium connection Br is therefore proportional to the supply pressure $P_p$ existing at the first pressure medium connection P until the upper threshold $p_2$ is reached.

On reaching the upper threshold value $p_2$, the actuating piston 7 is displaced so far against the restoring spring 11 that the guide section 8 closes the first pressure medium connection P completely. This position of the actuating piston 7 is shown in FIG. 2. The connection between the first pressure medium connection P and the second pressure medium connection Br is thus interrupted if the supply pressure $P_p$ exceeds the upper threshold value $p_2$. Provided that the pressure in the pressure chamber 15 drops below the upper threshold value $p_2$ due to draining of the pressure medium off towards the second pressure medium connection Br, the connection between the first pressure medium connection P and the pressure chamber 15 is restored in the short term owing to a slight displacement of the actuating piston 7 to the left in FIG. 2, until a pressure corresponding to the upper threshold value $p_2$ has built up again in the pressure chamber 15. The position of the actuating piston 7 in the range above the upper threshold value $p_2$ is therefore largely constant and the output pressure $p_{Br}$ existing at the second pressure medium connection Br is therefore kept largely constant by the combined hydraulic valve 1 according to the invention independently of the supply pressure $P_p$. In this range the hydraulic valve according to the invention therefore operates as a pressure-reducing or pressure-limiting valve.

A second control edge 41 formed at the first annular groove 19 is displaced here in FIG. 2 so far to the right that it ends virtually flush with the right delimitation of the first pressure medium connection P. The control edge 41 remains open just far enough to meet the requirement of the pressure medium draining off at the throttle 25.

The pressure medium flowing back from the hydraulic unit connected at the second pressure medium connection Br can drain off towards the pressure medium tank via the third annular groove 24, throttle 25, the spring space 12 and the third pressure medium connection T. Here the hydraulic valve 1 according to the invention is distinguished by the fact that the throttle 25 is likewise integrated into this valve.

FIGS. 5 and 6 show an axial longitudinal section through a further practical example of the invention. The construction of the combined hydraulic valve 1 shown in FIGS. 5 and 6, which valve also includes a pressure-reducing function and a control function and in which a throttle 25 is likewise integrated, largely corresponds to the practical example already described with reference to FIGS. 1 and 2. Components which have already been described are therefore designated by corresponding reference symbols, rendering description of these superfluous.

Compared with the practical example in FIG. 1 and 2, a stopping device 50 is also provided in the valve body 2, to stop the actuating piston 7 if required. The stopping device 50 comprises a threaded bolt 51, which can be displaced in rotation by means of a suitable tool, e.g. a screwdriver engaging in a groove 52. Connected to the spring space 12 in an axial direction on the side remote from the actuating piston 7 is a stepped hole 53, which connects the spring space 12 to an end face 54 of the valve body 2 accessible from outside. The stepped hole 53 has an inner thread 55 at least in sections, in which thread the outer thread 56 of the threaded bolt 51 engages. Inserted between the threaded bolt 51 and the actuating piston 7 is a fixing bolt 57, which is guided in the stepped hole 53.

The distance between the threaded bolt 51 and the actuating piston 7 can be reduced by turning the threaded bolt 51 to such an extent that this distance matches the length of the fixing bolt 57. The actuating piston 7, fixing bolt 57 and threaded bolt 51 can therefore be jammed against one another as shown in FIG. 5 so that the actuating piston 7 is immovable and is stopped in its starting position. This may be necessary e.g. during adjusting operations or installation operations.

By turning the threaded bolt the distance between the threaded bolt 51 and the actuating piston 7 can however easily be increased, so that the actuating piston 7 is freely movable and the hydraulic valve 1 according to the invention is able to respond and its control function and pressure-reducing or pressure-limiting function described here are fulfilled. The position of the threaded bolt 51 can be locked e.g. by a lock nut 58.

It should be emphasized that the stopping device 50 is accessible from outside and the function of the hydraulic valve according to the invention can therefore be influenced from outside.

FIG. 7 shows a further practical example of the hydraulic valve 1 according to the invention. This practical example is basically identical in construction with the practical example already described with reference to FIGS. 1 and 2. Elements which have already been described are therefore provided with corresponding reference symbols, so that no description of these is necessary.

In the practical example shown in FIG. 7 in an axial longitudinal section, a threaded hole 60 connecting the spring chamber 12 to the end face 54 of the valve body 2 accessible from outside adjoins the spring chamber 12. A threaded bolt 61 is insertable into the threaded hole 60 in such a way that its outer thread 62 engages with the inner thread 63 of the threaded hole 60. The threaded bolt 61 has at its end projecting into the valve body 2 a retaining section 64, which is used to fix a spring plate 65 on which the restoring spring 11 is supported. By turning the valve bolt 61 using a suitable tool, e.g. a screwdriver acting on the groove 66, the axial position of the spring plate 65 and thus the pre-tensioning of the restoring spring 11 can be varied. In this way the characteristic curve of the combined hydraulic valve 1 according to the invention can be changed, as the restoring force exerted by the restoring spring 11 has a significant influence on the lower threshold value $p_1$ and the upper threshold value $p_2$. The position of the threaded bolt 61 can be locked e.g. by means of a lock nut 67.

It should be emphasized with reference to this practical example also that the pre-tensioning of the restoring spring 11 is variable from outside by way of the threaded bolt 61 without the hydraulic valve 1 according to the invention having to be removed from its valve receptacle. This makes it easier to adjust the combined hydraulic valve 1 according to the invention and to reset the valve parameters in the event of servicing.

FIG. 8 shows a fourth practical example of the combined hydraulic valve 1 according to the invention. Like the practical example described with reference to FIGS. 5 and 6, this practical example comprises a stopping device 50, to stop the actuating piston 7 if required. Differently to the practical example shown in FIGS. 5 and 6, a fourth annular groove 71 is provided, which is separated from the third pressure medium connection T by means of a ridge 72 formed on the piston 7. The third annular groove 24 is also positioned so that in the starting position shown in FIG. 8 it is not connected to the second pressure medium connection Br.

The function of the combined hydraulic valve 1 according to the invention is basically the same as the practical examples described previously. As soon as the actuating piston 7 is displaced so far against the restoring spring 11 that the annular groove 71 is connected to the spring chamber 12 and thus the third pressure medium connection T, and at the same time the third annular groove 24 is displaced into the area of the second pressure medium connection Br, a throttled connection is created in all between the second pressure medium connection Br and the third pressure medium connection T, so that the return flow of the pressure medium to the pressure medium tank is guaranteed. In the starting position of the actuating piston 7 shown in FIG. 8, however, the second pressure medium connection Br is separated both from the first pressure medium connection P and from the third pressure medium connection T and thus also from the pressure medium tank. The actuating piston 7 can be fixed in this starting position by the stopping device 50, as already described with reference to FIGS. 5 and 6.

If a holding brake is connected at the second pressure medium connection Br, this has the advantage that the holding brake can be isolated from the pressure medium connections P and T if the hydraulic system fails and a constant pressure is maintained at the holding brake. If the hydraulic system fails, the hydraulic pressure at the holding brake can then be increased by means of a manual hydraulic pump (not shown) to such an extent that the holding brake is released and towing of the vehicle on which the holding brake is fitted is facilitated.

The invention is not limited to the practical examples shown. The hydraulic valve 1 according to the invention can be formed in several ways. In particular the axial longitudinal hole 21 can be replaced by grooves arranged on the outside of the guide sections 8 and 9. The guide section 9 can also be dispensed with if applicable and the first annular groove 19 and second annular groove 20 can be formed as a common annular groove running continuously axially.

I claim:

1. Combined hydraulic pressure-reducing and control valve (1) with a first pressure medium connection (P) formed in a valve body (2), a second pressure medium connection (Br) formed in the valve body (2) and an actuating piston (7) movable in the valve body (2), formed on which are a pressure surface (16), to displace the actuating piston (7) when acted upon by a supply pressure ($P_p$) existing at the first pressure medium connection (P) from a starting position against a restoring force proportional to the supply pressure ($P_p$), a first control edge (40) to connect the first pressure medium connection (P) above a preset minimum displacement of the actuating piston (7) corresponding to a lower threshold value ($p_1$) of the supply pressure ($P_p$) to the second pressure medium connection (Br), a second control edge (41) to interrupt the connection between the first pressure medium connection (P) and the second pressure medium connection (Br) above a preset maximum displacement of the actuating piston (7) corresponding to an upper threshold value ($p_2$) of the supply pressure ($P_p$), including a third pressure medium connection (T) and wherein a throttle (25) is formed between the second pressure medium connection (Br) and the third pressure medium connection (T).

2. Combined hydraulic pressure-reducing and control valve according to claim 1, characterized in that the throttle (25) is formed as a flattening or notch or hole on the actuating piston (7).

3. Combined hydraulic pressure-reducing and control valve according to claim 1, characterized in that the pressure surface (16) is formed on a face of the actuating piston (7).

4. Combined hydraulic pressure-reducing and control valve according to claim 3, characterized in that the restoring force is exerted by a restoring spring (11) supported on the end (13) of the actuating piston (7) opposing the pressure surface (16).

5. Combined hydraulic pressure-reducing and control valve according to claim 4, characterized in that the restoring spring (11) is supported on a spring plate (65), the position of which is adjustable for adjusting the restoring force exerted by the restoring spring (11).

6. Combined hydraulic pressure-reducing and control valve according to one of claim 1, characterized in that a first annular groove (19) is formed on the actuating piston (7), which groove is located in the area of the first pressure medium connection (P) in the starting position of the actuating piston (7) and is separated from the first pressure medium connection (P) when the maximum displacement of the actuating piston (7) is reached.

7. Combined hydraulic pressure-reducing and control valve according to claim 6, characterized in that a lateral edge of the first annular groove (19) forms the second control edge (41).

8. Combined hydraulic pressure-reducing and control valve according to claim 6, characterized in that a pressure chamber (15) bordering on the pressure surface (16) of the actuating piston (7) is formed in the valve body (2), which chamber is connected to the first annular groove (19).

9. Combined hydraulic pressure-reducing and control valve according to one of claim 6, characterized in that a second annular groove (20) is formed on the actuating piston (7), which groove is separated in the starting position of the actuating piston (7) from the second pressure medium connection (Br) and is displaced into the area of the second pressure medium connection (Br) when the minimum displacement of the actuating piston (7) is exceeded.

10. Combined hydraulic pressure-reducing and control valve according to claim 8, characterized in that a lateral edge of the second annular groove (20) forms the first control edge (40).

11. Combined hydraulic pressure-reducing and control valve according to claim 8, characterized in that the first annular groove (19), the second annular groove (20) and the pressure chamber (15) are connected to one another via one or more holes (21, 22, 23) provided in the actuating piston (7).

12. Combined hydraulic pressure-reducing and control valve according to claim 9, characterized in that a third annular groove (24) is formed on the actuating piston (7), which groove is connected to the throttle (25).

13. Combined hydraulic pressure-reducing and control valve according to claim 1, characterized in that a stopping device (50) is provided on the valve body (2), in order to stop the actuating piston (7) in a releasable manner.

* * * * *